Jan. 2, 1968  K. AYKAN  3,361,519
PbTi₃O₇ AND PROCESS FOR ITS MANUFACTURE
Filed Jan. 11, 1967
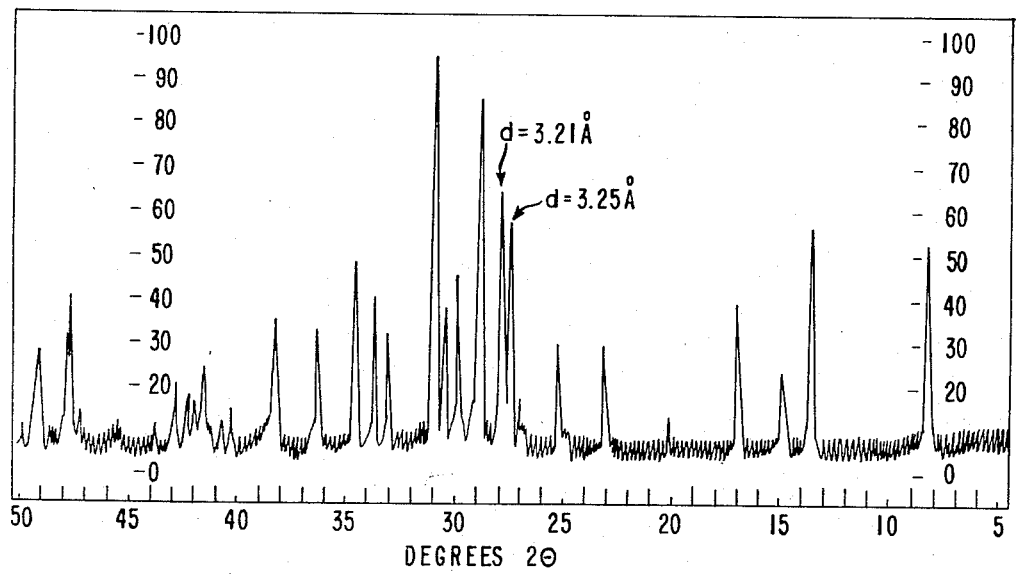
INVENTOR
KAMRAN AYKAN
BY
ATTORNEY

United States Patent Office 3,361,519
Patented Jan. 2, 1968

3,361,519
PbTi₃O₇ AND PROCESS FOR ITS
MANUFACTURE
Kamran Aykan, Woodbury, N.J., assignor to E. I. du
Pont de Nemours and Company, Wilmington, Del., a
corporation of Delaware
Filed Jan. 11, 1967, Ser. No. 608,619
5 Claims. (Cl. 23—51)

ABSTRACT OF THE DISCLOSURE

This invention relates to a new composition of matter, $PbTi_3O_7$, useful as a catalyst for the vapor-phase reaction of propylene and nitric oxide to form acrylonitrile, and to a process for the synthesis of said composition.

BACKGROUND OF THE INVENTION

In the process for the vapor-phase reaction of nitric oxide and propylene to form acrylonitrile, it is known in the art that lead titanate is a good catalyst. The synthesis of acrylonitrile using this catalyst is described in U.S.P. 3,141,902. Lead titanate, $PbTiO_3$ or $PbO \cdot TiO_2$, is formed by the reaction of equimolar amounts of PbO and $TiO_2$.

SUMMARY OF THE INVENTION

It has been discovered that a new composition of matter, $PbTi_3O_7$, can be prepared by a process comprising calcining a mixture of lead oxide and titanium dioxide, wherein the molar ratio of lead oxide to titanium dioxide is about from 1/2.5 to 1/3.5, at a temperature of about from 600° to 900° C., for about from 1 to 150 hours, and that this composition is useful as a catalyst in the synthesis of acrylonitrile.

BRIEF DECRIPTION OF THE DRAWING

The figure illustrates the X-ray diffraction pattern for $PbTi_3O_7$, the novel compound of the instant invention.

DESCRIPTION OF THE PREFERRED EMBODIMENTS

The starting materials for the synthesis of the novel compound of this invention are lead oxide (PbO) and titanium dioxide ($TiO_2$) or hydrated oxides of lead and titanium. These materials can be prepared before use in this process or precipitated from solution as indicated below.

If preformed reactants are used, any lead salt, oxide, hydroxide, or carbonate which is converted to PbO on calcination below 600° C. is suitable for the processes of this invention. Lead oxide, however, is preferred. The lead oxide can be either yellow (orthorhombic) or red (tetragonal), since the red is converted to yellow at temperatures of about 488° C., which is below the temperature required to form the composition of the invention. Of these, however, yellow lead oxide is preferred.

The titanium dioxide, if preformed, preferably should be in the anatase form. The titanium dioxide preferably should have a surface area of about from 1 to 300 m.²/g. Material having a surface area in the range of 10–30 m.²/g. is readily available and effective. Material with higher surface area, viz 200–300 m.²/g., is especially pre-ferred because it reacts more readily and at lower calcination temperatures, thereby facilitating formation of the compound of the invention.

The lead oxide and part of the titanium dioxide can also be supplied by using $PbO \cdot TiO_2$ as one of the starting materials to which is added sufficient hydrated titania or anatase $TiO_2$ to lower the $PbO/TiO_2$ molar ratio from 1/1, preferably to a ratio of about from 1/2.5 to 1/3.5.

Co-precipitated hydrated oxides suitable for the process of the invention can be formed from soluble salts of lead and titanium. For example, water soluble chelates of TiIV with acetyl acetone, with lactic acid (as the ammonium salt), and with triethanol amine can be used as a source of hydrated titanium oxide, as can the organic solvent-soluble tetraalkyl titanates, $Ti(OR)_4$ in which R is an alkyl radical from 1 to 8 carbon atoms, such as tetraisopropyl titanate and tetrabutyl titanate. Of these, the ammonium salt of titanium lactate chelate is preferred.

Lead salts which can be used in this process include, for example, lead acetate, basic lead acetates, lead nitrate, lead citrate, lead formate, lead isobutyrate, and lead lactate. Of these, lead acetate is preferred. These salts are placed in solution, preferably in amounts such that the atomic ratio of lead to titanium is about from 1/2.5 to 1/3.5. Solvents which can be used include, for example, water and alcohols of from 1–4 carbon atoms. Other solvents also may be used, and the solvent used for the lead salt may be the same as or different from the solvent used for the titanium salt provided that on mixing the solutions of said salts a substantially homogeneous mixture is obtained, free of phase separation. Hydrated oxides of lead and titanium can then be formed by adding ammonium hydroxide to the solution of the metal salts. The coprecipitated hydrated oxides can then be dried and calcined to form the composition of the invention.

As previously indicated, the molar ratio of the lead oxide to the titanium dioxide should be about 1/2.5 to 1/3.5, and a molar ratio of about 1/3 generally is preferred in order to obtain the maximum concentration of the composition of the invention. Otherwise the $PbTi_3O_7$ will be contaminated with $PbTiO_3$ or with excess $TiO_2$.

Mixtures of lead and titanium oxides are generally calcined for periods of 1 to 150 hours, preferably from 4 to 125 hours, at temperatures of about from 600° C. to 900° C., and preferably 750° to 850° C. The calcination time varies according to the surface area of the reactants, oxides of higher surface area requiring less calcination time. If coprecipitated mixed hydrated oxides of lead and titanium are employed in the process, the calcination can be accomplished in 2 hours at 650° C. The composition of the invention does not usually form below about 600° C., and at temperatures above about 900° C. undergoes irreversible decomposition with formation of $PbTiO_3$ and rutile $TiO_2$.

Determination of the crystalline phases present in reaction products at substantially room temperature can be done by X-ray diffraction techniques. X-ray diffraction patterns for the powdered solids are obtained, for example, with a Norelco or other X-ray diffractometer using nickel-filtered $Cu_{K\alpha}$ radiation.

To determine crystalline phases present at elevated temperatures, a Tem-Pres SX–2BR high temperature X-ray diffractometer attachment with temperature control (available from Tem-Pres Research, Inc., State College, Pa.) is used in combination with the Norelco diffractometer, a programming and recording unit, an electronic panel-recorder and a proportional detector.

As previously indicated, the compound of this invention can be used as a catalyst in vapor phase reactions. For such uses the composition can be used per se, or deposited on a support such as alumina or silica. In the latter case the lead oxide and titanium dioxide can be coprecipitated onto a support or carrier and then calcined to convert the two components to $PbTi_3O_7$ according to the instant disclosure.

The following examples further illustrate the instant invention.

Example 1

A solution containing 18.97 g. of lead II acetate trihydrate and 88.12 g. of a titanium-ammonium lactate chelate aqueous solution (containing 8.16% of titanium) in 141 g. water (atomic ratio of Pb/Ti=1/3) is added slowly to a solution containing 66 cc. of concentrated $NH_4OH$ (ca. 28% $NH_3$) in 220 cc. of water which is held at about 80° C. and is vigorously stirred until the addition is complete. The precipitate is digested in the alkaline solution for one hour at about 80° C., with slow agitation. Small amounts of $NH_4OH$ are added from time to time to maintain a strongly alkaline solution. The precipitate is separated by filtration and washed well with water containing small amounts of $NH_4OH$. The filtrate and wash waters are substantially completely free of lead and titanium, which are contained in the precipitate. The moist filter cake is heated in a muffle furnace rapidly from room temperature to 650° C. (approximately one hour) and held at this temperature for 4 hours, then at 750° C. for 20 hours, and cooled to room temperature. The density of the product is 5.85 g./cc., the X-ray powder diffraction pattern is shown in FIGURE 1, and the corresponding diffraction data for $PbTi_3O_7$ are tabulated below.

*X-RAY POWDER DIFFRACTION DATA FOR $PbO \cdot 3TiO_2$

| $I/I_{max} \times 100$ | $d_{obs}$, A. | $I/I_{max} \times 100$ | $d_{obs}$, A. |
| --- | --- | --- | --- |
| 55 | 10.66 | 27 | 2.47 |
| 59 | 6.52 | 27 | 2.36 |
| 19 | 5.95 | 29 | 2.34 |
| 35 | 5.24 | 7 | 2.33 |
| 6 | 4.44 | 9 | 2.24 |
| 24 | 3.86 | 5 | 2.22 |
| 6 | 3.59 | 5 | 2.19 |
| 30 | 3.54 | 17 | 2.18 |
| 10 | 3.32 | 17 | 2.17 |
| 48 | 3.25 | 11 | 2.16 |
| 60 | 3.21 | 12 | 2.14 |
| 88 | 3.10 | 15 | 2.11 |
| 84 | 3.08 | 4 | 2.07 |
| 44 | 3.00 | 6 | 2.00 |
| 36 | 2.94 | 6 | 1.98 |
| 100 | 2.89 | 6 | 1.93 |
| 29 | 2.71 | 47 | 1.906 |
| 34 | 2.66 | 20 | 1.853 |
| 44 | 2.59 | 15 | 1.848 |

*I=observed relative X-ray diffraction intensity of any selected peak of the diffraction pattern.
$I_{max}$=intensity of strongest peak.
$d_{obs}$=observed interplanar spacing in A. units.
All intensities are corrected for background in accordance with standard practice.

X-ray powder diffraction techniques indicate that this sample of $PbTi_3O_7$ contains not more than 1% of tetragonal $PbTiO_3$. The strongest X-ray diffraction peak of the composition of the invention corresponds to an interplanar spacing of 2.89 A.

X-ray diffraction data obtained at elevated temperatures show that the compound of the invention begins to decompose at an appreciable rate at temperatures above about 900° C. to form $PbTiO_3$ and rutile. The change is irreversible, and is rapid above 1000° C.

To demonstrate the catalytic activity of the composition of the invention, a preparation is made as described above except that the atomic ratio of lead/titanium is 1/3.5. The calcined product consists of $PbTi_3O_7$, containing rutile $TiO_2$ which is catalytically inactive, and is completely free of $PbTiO_3$. The calcined product is mixed with inert carrier (anatase $TiO_2$) in the ratio of 1/4 by weight, shaped into 3/16″ diameter pellets, and heated in air at 500° C. for 1 hour. The pellets have a pore volume of 0.29 cm./g. and a surface area of 10.4 m.²/g. When tested for catalytic activity as described in U.S. 3,141,902 using a feed containing 25.2% propylene, 7.2% NO, balance $N_2$, at a reaction temperature of about 510° C. and contact time of about 2 seconds, the average conversion of NO to acrylonitrile in a one-hour period is 67% of theoretical, the yield of acrylonitrile is 72% of theoretical, and the ratio of acrylonitrile to acetonitrile in the product stream is about 9.

Example 2

A mixture containing a 1:3 molar ratio of yellow PbO to anatase $TiO_2$ (pigment grade, 0.2–0.3µ particle size) is ball milled under acetone for about one hour to insure complete mixing. The mixed solid is separated from the acetone medium and hydraulically compacted into a small bar about ¼″ x ¼″ x 2″ in size. The bar is heated from room temperature to 600° C. in about 2 hours, then held at 600° C. for about 2 hours, and finally is calcined at about 800° C. for periods of time up to 133 hours. The composition of the invention is present after 5 hours of heating at about 800° C., and after 133 hours heating comprises about 95% of the weight of the calcined mass, as determined by X-ray diffraction techniques. Substantially no $PbTi_3O_7$ is formed by calcining at 700° C. Small amounts of rutile $TiO_2$ may appear with $PbTi_3O_7$ after extended heating even at 800° C., and significant amounts of rutile $TiO_2$ appear by calcining the mixture for five hours at about 900° C. If products substantially free of $PbTiO_3$ are to be made from PbO and anatase $TiO_2$, an excess of $TiO_2$ is employed ($PbO/TiO_2$ about 1/3.5), and calcination is continued for more than 100 hours at a temperature of about from 750 to 800° C.

The $PbTi_3O_7$ obtained in this example is of lesser catalytic activity because of the relatively low surface area produced during high temperature calcination.

Example 3

A solution of 14.16 g. of lead subacetate (73.2% Pb) in 100 ml. of methanol containing 3.8 ml. of glacial acetic acid is mixed with a solution containing 42.8 g. of tetraisopropyl titanate (containing 16.8% titanium) in 70 ml. of isopropanol (atomic ratio of Pb/Ti=1/3), and the mixture is added gradually to a solution of 70 ml. of concentrated ammmonium hydroxide (about 28% $NH_3$) in 250 ml. of water which is held at about 80° C. and vigorously agitated. The co-precipitated mixed hydrated oxides are separated and calcined as in Example 1. The calcined product is $PbTi_3O_7$.

I claim:
1. A new composition of matter, $PbTi_3O_7$.
2. A process for the synthesis of $PbTi_3O_7$ comprising calcining a mixture of lead oxide and anatase titanium dioxide, in a molar ratio of about 1/2.5 to 1/3.5 at a temperature of about from 600° to 900° C. for about from 1 to 150 hours.
3. A process of claim 2 wherein the molar ratio of lead oxide to titanium dioxide is about 1 to 3 and the temperature of calcination is about from 750 to 850° C., and the time of calcination is about from 4 to 30 hours.
4. A process for the synthesis of $PbTi_3O_7$ comprising calcining a co-precipitated mixture of hydrated lead oxide and hydrated titanium oxide in atomic ratios of lead to titanium of about 1/2.5 to 1/3.5 at a temperature of about from 600° to 900° C. for about from 1 to 150 hours.
5. A process of claim 4 wherein the atomic ratio of lead to titanium is about 1 to 3, the temperature of cal- cination is about from 650° to 750° C., and the time of calcination is about from 1 to 20 hours.

References Cited

UNITED STATES PATENTS

| | | |
|---|---|---|
| 1,929,521 | 10/1933 | Ryan et al. |
| 2,140,222 | 12/1938 | Espenschied _____ 23—51 X |
| 2,607,659 | 8/1952 | Rummery _____ 23—51 |
| 3,023,226 | 2/1962 | England et al. _____ 260—465.3 |
| 3,141,902 | 7/1964 | Huntley et al. _____ 252—461 X |
| 3,184,415 | 5/1965 | Huntley et al. _____ 252—461 |

FOREIGN PATENTS

| | | |
|---|---|---|
| 541,841 | 6/1957 | Canada. |
| 416,615 | 9/1934 | Great Britain. |

OSCAR R. VERTIZ, *Primary Examiner.*

H. T. CARTER, *Assistant Examiner.*